(12) United States Patent
Karuppiah et al.

(10) Patent No.: US 11,924,288 B2
(45) Date of Patent: Mar. 5, 2024

(54) METHODS AND SYSTEMS FOR TRANSFERRING A USER SESSION BETWEEN DEVICES

(71) Applicant: ARRIS Enterprises LLC, Suwanee, GA (US)

(72) Inventors: Sadeesh Kumar Karuppiah, Bangalore (IN); Anand Madhav Rao Hallur, Karnataka (IN)

(73) Assignee: ARRIS Enterprises LLC, Horsham, PA (US)

(*) Notice: Subject to any disclaimer, the term of this patent is extended or adjusted under 35 U.S.C. 154(b) by 0 days.

(21) Appl. No.: 17/465,986

(22) Filed: Sep. 3, 2021

(65) Prior Publication Data
US 2022/0210231 A1 Jun. 30, 2022

Related U.S. Application Data

(60) Provisional application No. 63/132,223, filed on Dec. 30, 2020.

(51) Int. Cl.
*H04L 67/148* (2022.01)
*G06F 9/445* (2018.01)
(Continued)

(52) U.S. Cl.
CPC ............ *H04L 67/148* (2013.01); *G06F 9/445* (2013.01); *H04L 65/1094* (2022.05); *H04L 65/1095* (2022.05); *H04L 67/141* (2013.01)

(58) Field of Classification Search
CPC ............... H04L 67/148; H04L 65/1094; H04L 65/1095; H04L 67/141; G06F 9/445
See application file for complete search history.

(56) References Cited

U.S. PATENT DOCUMENTS 9,413,590 B2 * 8/2016 Breard ................ H04L 61/2575
10,798,431 B2 * 10/2020 Jana ..................... H04L 65/1016
(Continued)

FOREIGN PATENT DOCUMENTS

EP          1 958 414 B1     6/2016
WO        2005/015882 A1    2/2005
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 21, 2021, by the International Application Division Korean Intellectual Property Office in corresponding International Application No. PCT/US2021/049037. (9 pages).

*Primary Examiner* — Ramy M Osman
(74) *Attorney, Agent, or Firm* — Panitch Schwarze Belisario & Nadel LLC

(57) ABSTRACT

Exemplary embodiments are directed to a method and system for transferring a user session between a source device and a target device. The method may include receiving a request to transfer a user session from a source device to the target device, the user session corresponds to a running session between the source device and a session end point device, receiving session data corresponding to the user session transfer request, determining, at the target device, a corresponding launch application for the user session using the session data, launching the corresponding launch application to initiate a transfer of the user session; and replacing the source device in the running session by establishing a communication channel with the session end point device upon the launch of the corresponding launch application using the session data and terminating the user session at the source device.

16 Claims, 5 Drawing Sheets

(51) Int. Cl.
*H04L 65/1094* (2022.01)
*H04L 65/1095* (2022.01)
*H04L 67/141* (2022.01)

(56) References Cited

U.S. PATENT DOCUMENTS

| | | | | |
|---|---|---|---|---|
| 2003/0195963 | A1* | 10/2003 | Song | H04L 67/142 709/227 |
| 2006/0105770 | A1* | 5/2006 | Jagadeesan | H04W 4/16 455/444 |
| 2006/0126648 | A1* | 6/2006 | Park | H04L 65/1101 370/401 |
| 2007/0030826 | A1* | 2/2007 | Zhang | H04L 65/1104 370/331 |
| 2007/0094490 | A1* | 4/2007 | Lohr | H04L 67/14 713/153 |
| 2007/0234048 | A1* | 10/2007 | Ziv | H04L 67/142 713/159 |
| 2007/0291694 | A1* | 12/2007 | Zhang | H04L 67/14 370/351 |
| 2008/0059639 | A1* | 3/2008 | Zhang | H04L 67/1008 709/227 |
| 2008/0084867 | A1* | 4/2008 | Foti | H04L 65/1094 370/352 |
| 2009/0193474 | A1* | 7/2009 | Stein | H04L 12/2812 725/141 |
| 2009/0210536 | A1* | 8/2009 | Allen | H04L 67/14 709/227 |
| 2009/0259758 | A1* | 10/2009 | Chen | H04L 65/1094 709/228 |
| 2011/0270933 | A1* | 11/2011 | Jones | H04L 65/1083 715/753 |
| 2013/0102250 | A1* | 4/2013 | Mutikainen | H04W 4/00 455/41.2 |
| 2013/0314491 | A1* | 11/2013 | Vivekanandan | H04L 65/756 348/14.08 |
| 2013/0318249 | A1* | 11/2013 | McDonough | H04L 63/08 709/228 |
| 2015/0020185 | A1 | 1/2015 | McDonough et al. | |
| 2016/0057139 | A1* | 2/2016 | McDonough | H04L 67/148 726/6 |
| 2016/0112464 | A1* | 4/2016 | Nyshadham | H04L 65/1069 709/227 |
| 2018/0343310 | A1* | 11/2018 | Mishra | H04L 67/148 |
| 2019/036787 | A1* | 1/2019 | Tahara | H04L 41/142 |
| 2022/0210231 | A1* | 6/2022 | Karuppiah | H04L 65/1095 |

FOREIGN PATENT DOCUMENTS

| | | |
|---|---|---|
| WO | 2009/032824 A1 | 3/2009 |
| WO | 2014/063739 A1 | 5/2014 |

* cited by examiner

METHODS AND SYSTEMS FOR TRANSFERRING A USER SESSION BETWEEN DEVICES

FIELD

The present disclosure is related to controlling user sessions, and particularly to controlling the transfer of a user session between devices.

BACKGROUND

Users are increasingly using a variety of computing devices to interact with one or more applications and to communicate with other users. While interacting with one or more applications or communicating with other users, a user may want to transition from one type of computing device to a different type of computing device to continue the interaction or communication with better visual experience. Typically, in order for a user to transition an application or communication to a different device, the user would have to manually redo the processes performed on the original device on the new transition device which is time consuming and not user friendly. As such, it is desirable to provide a method and system for seamlessly transferring a user session between devices.

SUMMARY

An exemplary method for transferring a user session between a source device and a target device. The method may include receiving a request to transfer a user session from a source device to the target device, the user session corresponds to a running session between the source device and a session end point device, receiving session data corresponding to the user session transfer request, determining, at the target device, a corresponding launch application for the user session using the session data, launching the corresponding launch application to initiate a transfer of the user session; and replacing the source device in the running session by establishing a communication channel with the session end point device upon the launch of the corresponding launch application using the session data and terminating the user session at the source device.

An exemplary system for transferring a user session between a source device and a target device. The system including a network interface configured to receive a user session transfer request and session data from a source device and configured to send a user session termination signal to the source device; a memory configured to store session data and computer executable instructions; and a session transfer module including at least one processor configured to execute the computer executable instructions to: receive a request to transfer a user session from a source device to a target device; receive session data corresponding to the user session transfer request; determine a corresponding launch application for the user session using the session data; launch the corresponding launch application to initiate a transfer of the user session; and replace the source device in the running session by establishing a communication channel with the session end point device upon the launch of the corresponding launch application using the session data and terminating the user session at the source device.

DETAILED DESCRIPTION

Figure 1:
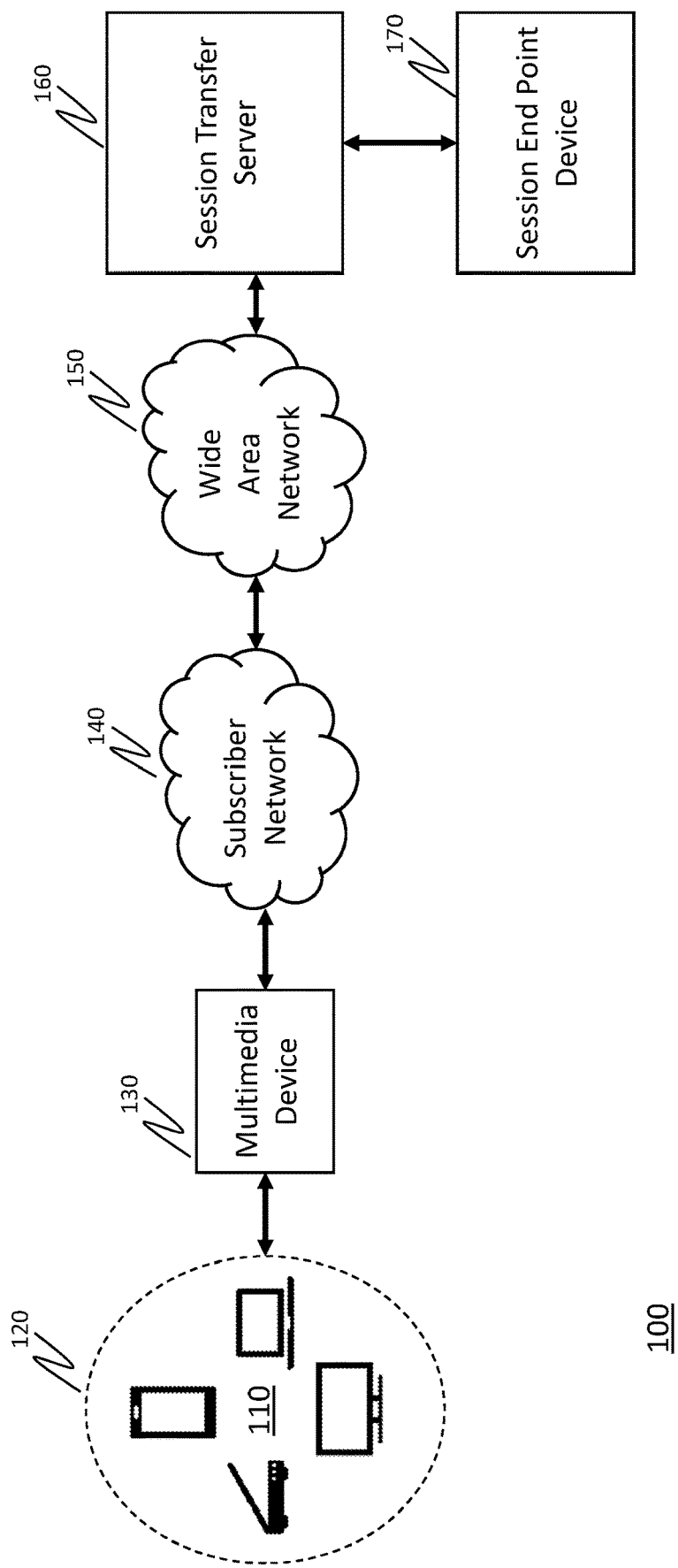
FIG. 1 is a block diagram illustrating an example network environment operable to facilitate the transfer of a user session between devices in accordance with an exemplary embodiment of the present disclosure.

The exemplary methods and systems described in this disclosure enable the transfer of a user session from a source device to a target device based on the proximity of the devices. The user session transfer may be initiated manually by a user or automatically by a utility application. In the manual mode, a user may access an application at a source device, wherein the application allows the user to initiate a transfer of an established user session between the source device and a session end point device to a target device. The user may initiate a user session transfer request manually by swiping a touch screen interface on a touch source device or by pressing a button on a non-touch source device. The application may be stored on both the source device and the target device and the application may provide one or more multimedia services (e.g., video conferencing) to each device. Moreover, the application may include a session transfer feature which allows the user to send a user session transfer request to a target device. In the automatic mode, a user session transfer request may be automatically initiated using a utility application on the source device based on the proximity of the source device and target device.

The source device is a computing device (e.g., one of client devices 110) that has already established a user session with a session end point device 170. The source device may include an interface (e.g., a touch screen graphical user interface) that allows the user to select the session transfer feature. Moreover, the interface may allow the user to select a target device for the user session transfer. The target device is a computing device (e.g., multimedia device 130) selected by the source device to replace the source device in a running session with session end point device 170. One or more target devices may be presented to the user via the interface for selection for the user session transfer. The one or more target devices presented as selections may be identified based on their proximity to the source device. The interface may include tiles representing one or more target devices. In a manual mode, a user may use a swipe input to select the session transfer feature and to select a target device for the session transfer (e.g., by swiping in a particular direction). In embodiments, particularly where a source device does not include a touch screen interface, the source device may include a dedicated button integrated on the source device to select the session transfer feature (i.e., push button input). A user would press the button to initiate a user session transfer request.

In the automatic mode, a user session transfer may be automatically initiated using a utility application running on the source device and/or the target device. The utility application may be set to automatically send a user session transfer request to a target device based on the proximity of the source device and the target device. A user may enable a setting at the source device to transfer a user session to a target device upon detection of the target device within a predefined proximity of the source device. The predefined proximity may correspond to a maximum allowable distance between two nodes (e.g., a node may correspond to a client device 110 which is directly connected to home network 120) that are directly connected to a same network (e.g., LAN 120). The user may set a target device setting which allows the user to preselect a desired target device to which the user session should be transferred.

FIG. 1 is a block diagram illustrating an example network environment 100 operable to facilitate the control of a user session transfer in accordance with exemplary embodiments of the present disclosure. The network environment 100 can include one or more client devices 110, a local area network (LAN) 120, at least one multimedia device 130, a subscriber network 140, a wide area network (WAN) 150, at least one session management server 160 and at least one session end point device 170. While the multimedia device 130 and client devices 110 are shown in FIG. 1 as separate devices, it should be understood that the various components can be integrated into each other.

Client devices 110 may include a television, mobile device, tablet, computer, gaming device, a multimedia device (e.g., other set-top boxes) and any other device operable to receive video, voice, and/or data services. In embodiments, various services may be delivered to the client devices 110, including but not limited to, live or broadcast television, video-on-demand (VoD) content, pay-per view content, recorded content (e.g., DVR content), audio-only content, streaming content, and other various video, data, and/or voice services.

It will be appreciated by those skilled in the relevant art that client devices 110 may be capable of interacting and communicating with each other over various wireless communication standards (e.g., Wi-Fi, Bluetooth, etc.). Client devices 110 connected to a LAN 120 (e.g., a home network) may receive services from multimedia device 130 according to one or more subscriptions between a subscriber and service provider. The client devices 110 communicate with multimedia 130 over LAN 120 (e.g., home network). The LAN may include a wireless local area network (WLAN), and/or a multimedia over coax alliance (MoCA) network. It should be noted that client devices 110 may establish a user session with session end point device 170 over LAN 120 and WAN 150. A session end point device may include any device operable to receive video, voice, and/or data services.

According to an exemplary embodiment, the multimedia device 130 may include one or more access points (e.g., gateway device, modem device, or combination thereof), set-top boxes, and digital living network alliance (DLNA) multimedia devices. The multimedia device 130 provides multimedia content (e.g., video, data and/or voice services) to one or more client devices 110 and performs user session transfer processes to take over a user session when selected as a target device. It should be further understood that a television may be connected to and controlled by multimedia device 130.

The multimedia device 130 can be connected to send and receive user session content to and from session transfer server 160 over a wide area network (WAN) 150 through a connection to a subscriber network 140 (e.g., a local area network (LAN), a wireless local area network (WLAN), a personal area network (PAN), mobile network, high-speed wireless network, etc.). Each of the communication networks (i.e., 120, 140 and 150) can be configured to transmit and receive information over a combination of wired and wireless transmission protocols as desired. WAN 150 may comprise a plurality of networks of one or more network types coupled via appropriate methods known in the art, such as the Internet, a public-land mobile network (PLMN), a public-switched telephone network (PSTN), or a cellular network.

The session transfer server 160 aids in the management and establishment of a session between devices. A session (i.e., user session) is essentially an interactive information interchange over a communication channel between two or more computing devices (e.g., 110, 130, 170) on a network. The session transfer server may function as the core component in a running session (i.e., an established session between two or more devices) by directing communications between all other components of the running session (e.g., user interface, network interface). The server 160 may store user data (login credentials) and video conference (i.e., meeting) data/metadata (e.g., meeting schedule, meeting list, meeting host, etc.). The server may provide meeting notifications to devices. The session transfer server may allow a user to join a running session (e.g., an active video conference session between two or more computing devices), to schedule a future session (e.g., schedule a video conference), to start a session (e.g., start a video conference). Hence, when a user launches an application (e.g., a video conference application) on a client device 110 to establish a session (i.e., video conference) with a session end point device 170, the session transfer server 160 aids in establishing the session between the devices. In embodiments, the session transfer server may host the user session. In embodiments, the session transfer server may be implemented as an enterprise-based server.

Figure 2:
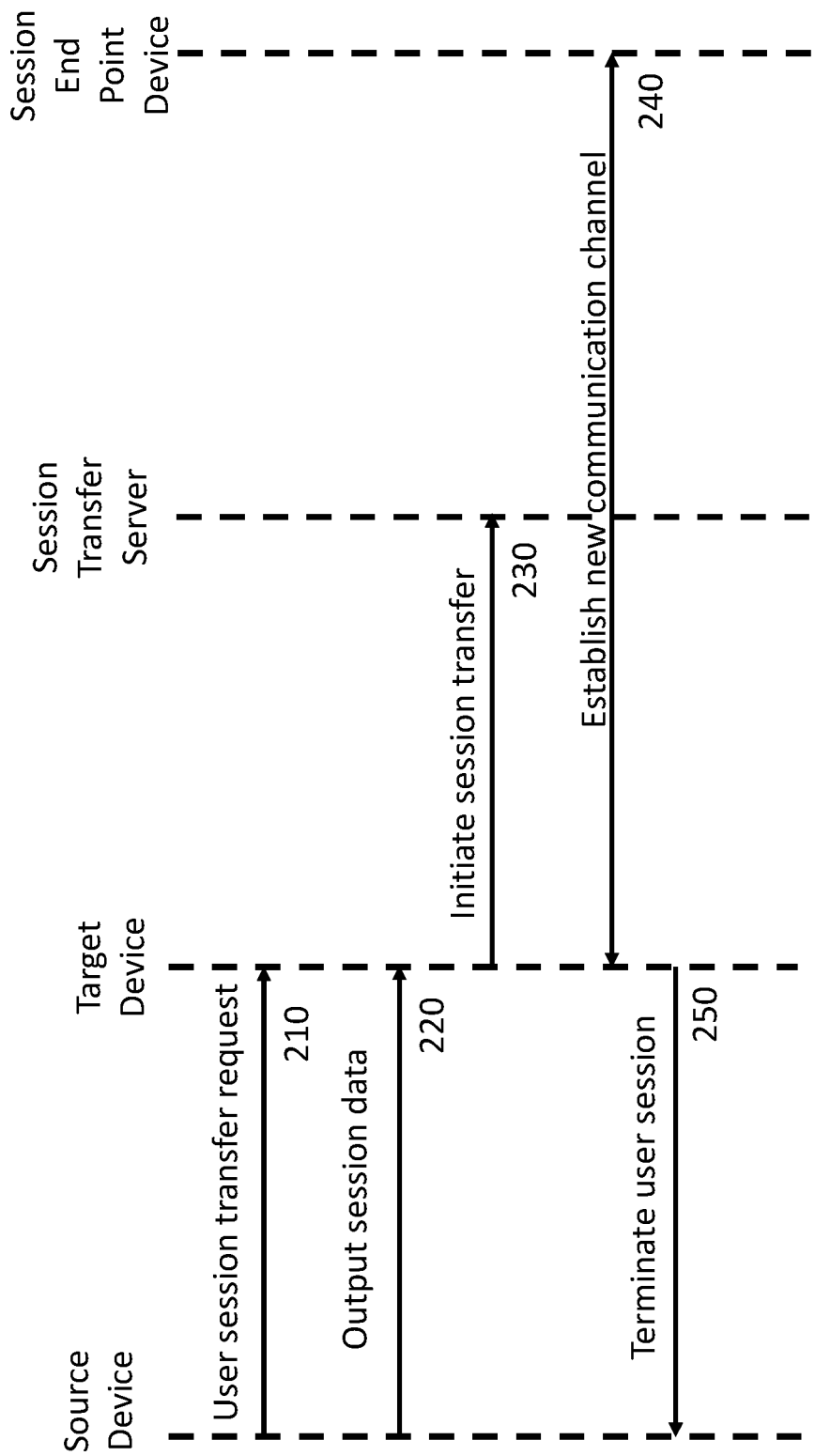
FIG. 2 illustrates an exemplary transition diagram showing communications operable to facilitate the transfer of a user session between devices in accordance with an exemplary embodiment of the present disclosure.

FIG. 2 illustrates an exemplary transition diagram 200 showing communications operable to facilitate the transfer of a user session between devices (i.e., a source device and a target device). In embodiments, a user at a source device (e.g., one of client devices 110) may have established a user session (e.g., a video conference) with a session end point device 170 using an application (e.g., video conference application). A user session transfer may be initiated manually or automatically. In embodiments, the user session transfer may be initiated at a source device (e.g., client device 110) or a target device (e.g., multimedia device 130).

When the user session transfer is initiated manually, the user may select a session transfer feature of the application to initiate a transfer of the established session to a target device. Upon selection of the session transfer feature, a user session transfer request 210 is sent to a target device (e.g., multimedia device 130). Upon receipt of the user session transfer request, the target device may requests session data from the source device. The session data may include, for example, application name (i.e., the name of the application used/launched by the source device to establish the user session with the session end point device 170), session credentials (e.g., login credentials to join a video conference), etc. The login credentials can be fetched from a meeting organizer application (e.g., Microsoft Calendar using REST API) running on the source device. The source device outputs the session data 220 to the target device. The session data may be output to the target device using, for example, a Discovery and Launch (DIAL) protocol to exchange session transfer data with the target device. In embodiments, the source device may automatically fetch the session data (without receiving a request for the session data from the target device) and output the session data to the target device.

When the user session transfer is initiated automatically, a utility application running on the source device may automatically initiate a session transfer request 210 to a target device upon detection of the target device within a predefined proximity of the target device. The target device (e.g., multimedia device 130) may be detected using, for example, a simple service discovery protocol (SSDP) search, which is capable of discovering what devices are directly connected to a same network. A discoverable device on a network will inherently be within a maximum distance allowed between the nodes in the network, or the device will not discoverable. So, for example, a LAN 120 may have a maximum distance of one (1) mile between two nodes on the network 120 in order for a device to be connected to the LAN 120 and discoverable therefrom. Once the target device is detected, the session data may be automatically fetched from the source device (e.g., using a calendar application on the source device) and the session data is output 220 to the target device using, for example, a Discovery and Launch (DIAL) protocol to exchange session transfer data with the target device. The data exchanged using DIAL can be in JavaScript Object Notation (JSON) format and encrypted. The data exchange in JSON format may include, for example, the following:

```
{"videoconference_session":
  {
    "application_name":"zoom", // zoom/webex/teams etc
    "Id Token": <id token>,
    "meeting_id": "83412345"
    "Access token" : <access token>
application
    "friendly_name": "Smith",
    "sender_device": "Lenovo xxx"
  }
}
```

Upon receiving the session transfer request 210 and the session data 220, the target device initiates a session transfer process 230 with session transfer server 160. The session transfer process can parse the session data to determine the application required to be launched to take over the user session with the session end point device 170. Thereafter, the target device may launch the required application 230 and use the session credentials obtained from the source device to join the running user session established with session end point device 170. When the target device successfully joins the running session, a new communication channel is established 240 between the target device and the session end point device. The target device may negotiate new session terms (e.g., resolution parameters) for the user session when the new communication channel is established.

Upon successful launch of the required application and session credentialing (i.e., using the session credentials to join the session), the target device is joined in the session 240, thereby replacing the source device in the running session upon termination of the user session at the source device. Moreover, upon successful launch of the required application and session credentialing, the target device terminates the user session 250 at the source device by sending a user session terminate signal to the source device.

Figure 3:
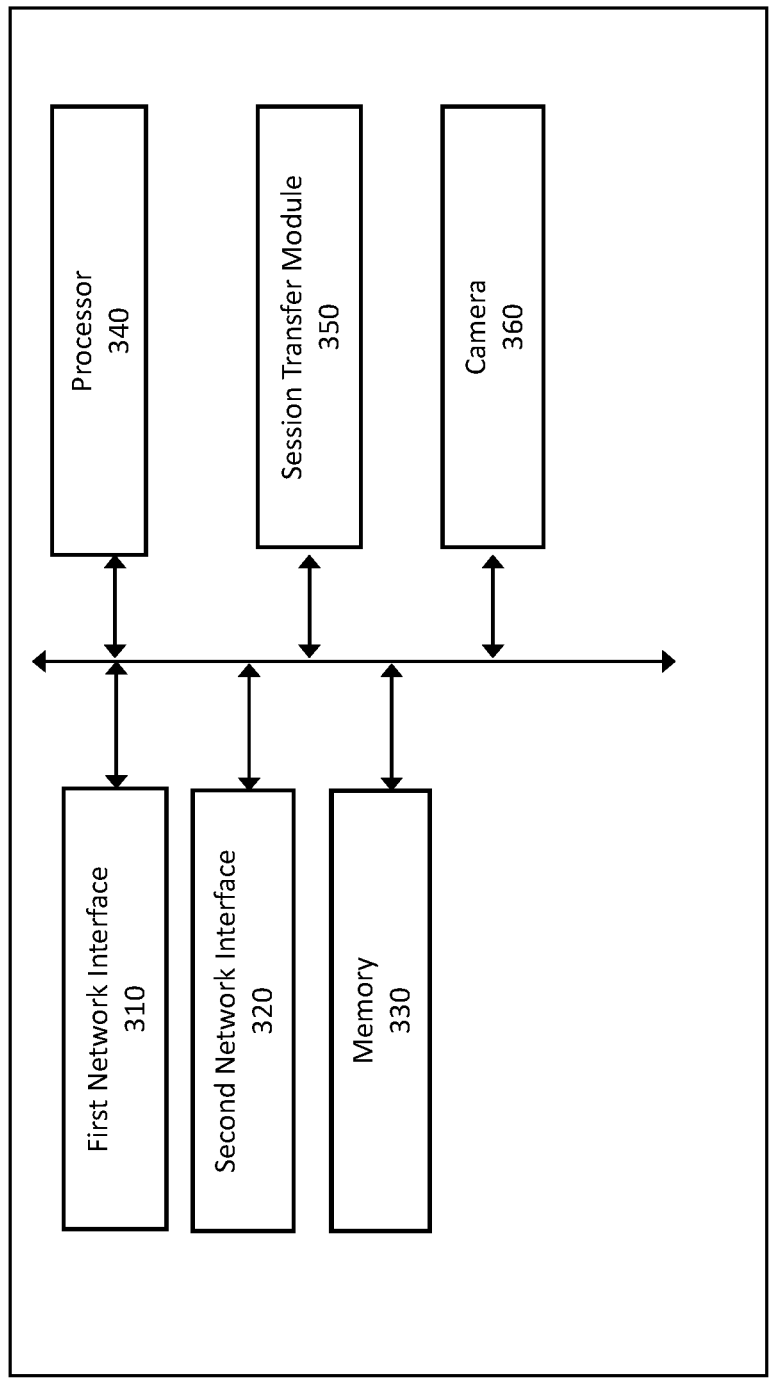
FIG. 3 is a block diagram illustrating an exemplary multimedia device operable to take over a user session from a source device in accordance with an exemplary embodiment of the present disclosure.

FIG. 3 is a block diagram illustrating an exemplary multimedia device 130 operable to take over a user session from a source device in accordance with exemplary embodiments of the present disclosure. The multimedia device 130 may include a first network interface 310, a second network interface 320, a memory 330, a processor 340, a session transfer module 350, a camera 360 and any other combination of hardware and software components as desired. In embodiments, the multimedia device may include a touch screen display for receiving user inputs.

The first network interface 310 (i.e., interface to networks 140, 150) can be configured to send and receive data/requests relating to a user session transfer to and from session transfer server 160 and session end point device 170. It should be understood that the first network interface 310 may include any interface configured to send and receive data/requests to and from session transfer server 160 and session end point device 170.

The second network interface 320 (i.e., interface to network 120) can be configured to send and receive data to and from client device(s) 110 over home network 120. The second network interface can receive user session transfer request 210 and session data 220 from a source device (e.g., one of client devices 110). Moreover, the second network interface can send a user session termination signal to a source device. It should be understood that the second network interface 320 may include any interface configured to deliver and receive content to and from client device(s) 110. In embodiments, second network interface may include hardware/software that provides communications over home network, such as, for example, Wi-Fi, Zigbee, Bluetooth, Ethernet, Multimedia over Coax Alliance (MoCA), RF, etc.

The memory 330 (e.g., random access memory (RAM), non-volatile secondary storage, hard drive, a floppy drive, and a CD-ROM drive) may store data (e.g., session transfer data, session data), business logic rules, applications (e.g., video conference application), computer executable instructions (e.g., session transfer module computer executable instructions).

Processor 340 can be configured to control the operation of multimedia device 130. As such, processor 340 processes session transfer module computer executable instructions (i.e., session transfer module 350) to receive a request to transfer a user session from a source device to a target device; receive session data corresponding to the user session transfer request; determine a corresponding launch application for the user session using the session data; launch the corresponding launch application to initiate a transfer of the user session; and replace the source device in the running session by establishing a communication channel with the session end point device upon the launch of the corresponding launch application using the session data and terminating the user session at the source device.

Figure 4:
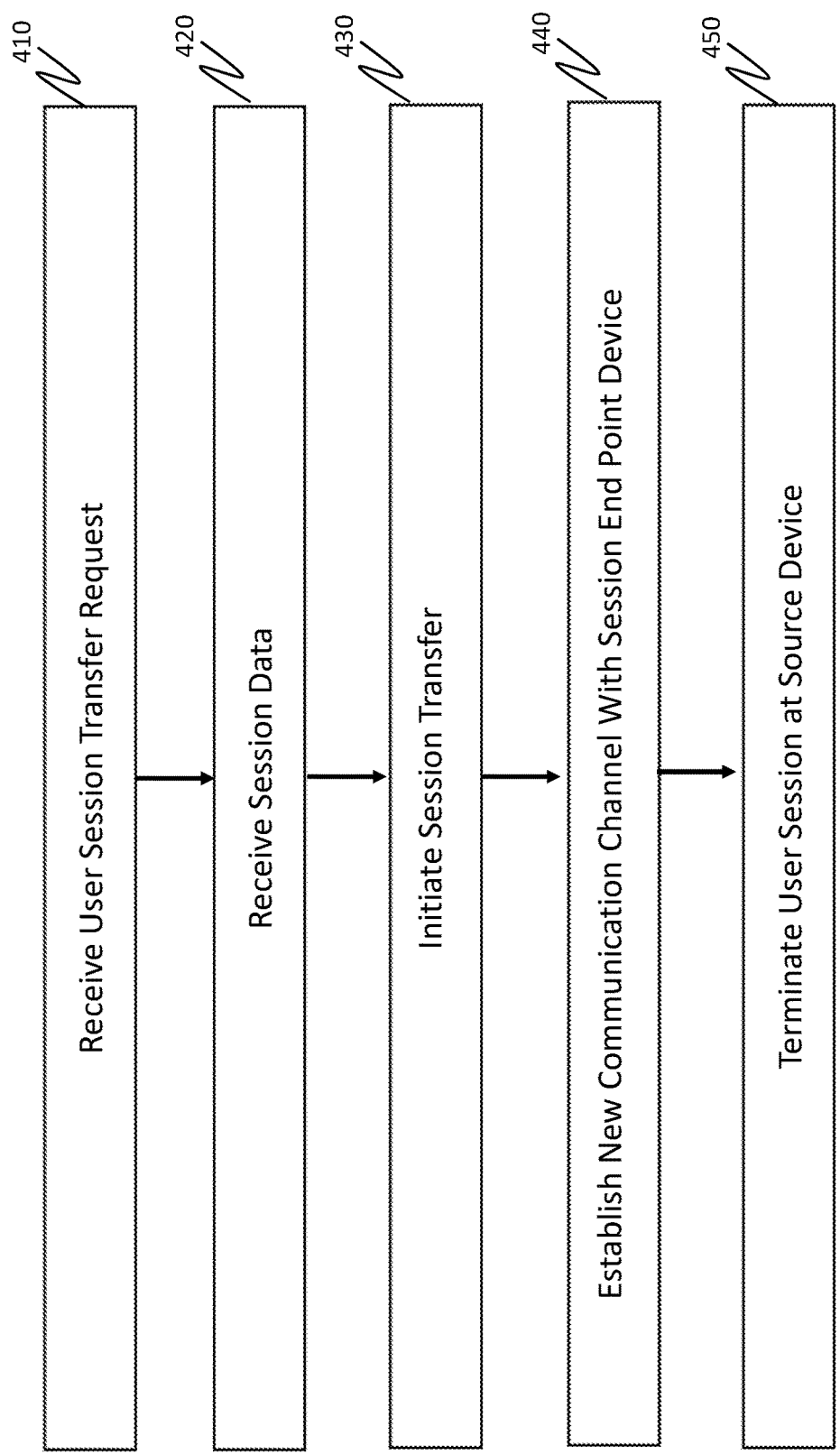
FIG. 4 illustrates a method for transferring a user session between devices in accordance with an exemplary embodiment of the present disclosure.

FIG. 4 illustrates a method 400 for transferring a user session between devices based on proximity in accordance with an exemplary embodiment of the present disclosure.

At step 410, a target device (e.g., multimedia device 130) may receive a user session transfer request 210 from a source device (e.g., one of client devices 110). At step 420, the target device may receive session data from the source device. The session data may include, for example, an application name (i.e., the name of the launch application), session credentials (e.g., login information, meeting/video conference data, etc.). At step 430, the target device initiates a session transfer (i.e., executing session transfer module 350) with session transfer server 160. At step 440, the target device establishes a new communication channel with session end point device 170. At step 450, the target device 130 terminates the user session 250 at the source device by sending a user session terminate signal to the source device.

Figure 5:
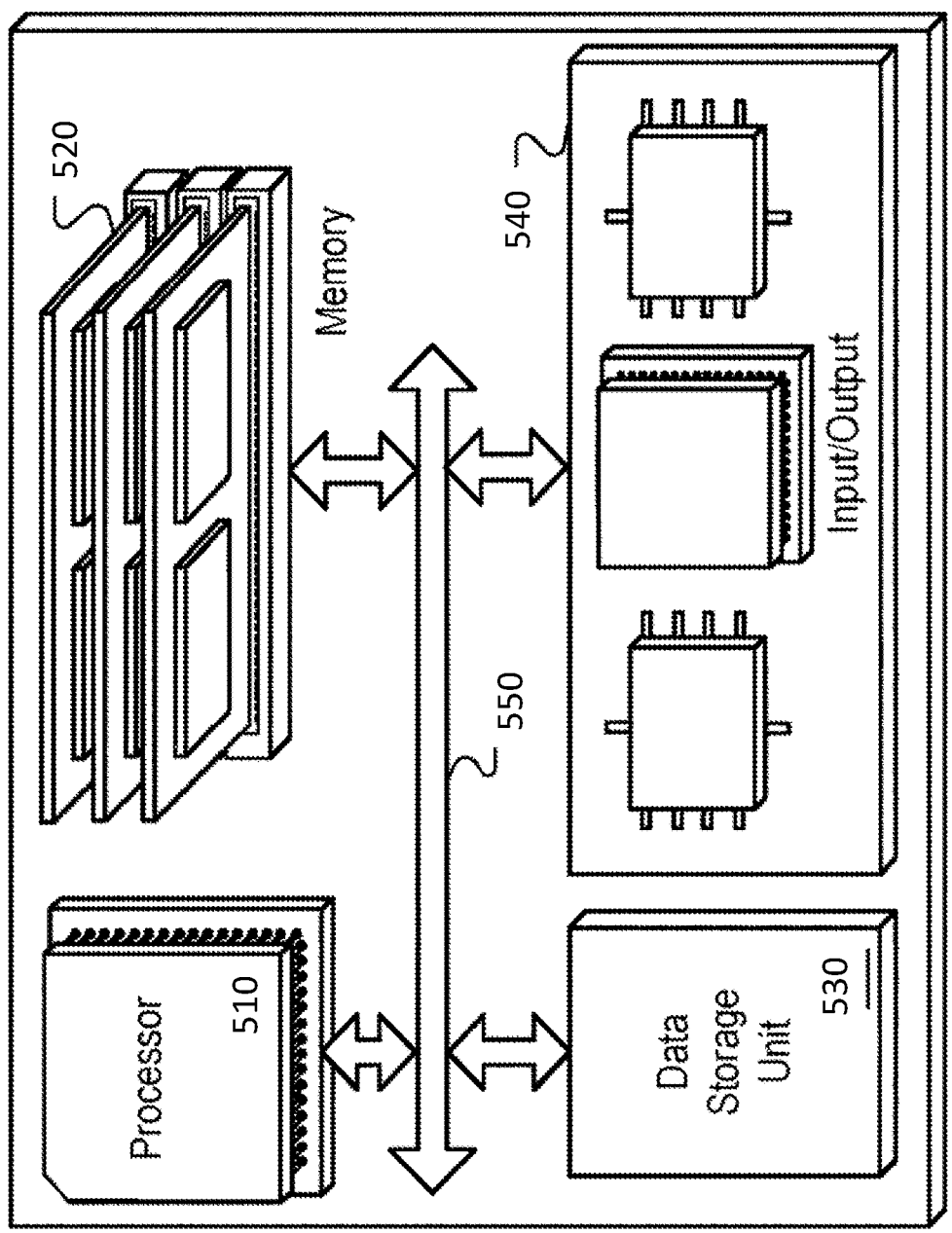
FIG. 5 is a block diagram of a hardware configuration operable to facilitate the transfer of a user session between devices in accordance with an exemplary embodiment of the present disclosure.

FIG. 5 is a block diagram of a hardware configuration 500 operable to facilitate the control of transferring a user session between devices in accordance with exemplary embodiments of the present disclosure. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 140 of FIG. 1, WAN 150 of FIG. 1, home network 120 of FIG. 1, etc.).

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be, in some embodiments, an apparatus or device embodying the invention in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method for transferring a user session between devices, the method comprising:
    receiving, at a target device, from a source device, a request to transfer a user session from the source device to the target device, wherein the user session corresponds to a running session between the source device and a session end point device;
    in response to receiving the request to transfer the user session, transmitting, by the target device, a session data request to the source device, wherein said session data is associated with the running session between the source device and the session end point device;
    subsequent to transmitting the session data request, receiving, at the target device, from the source device, session data corresponding to the user session transfer request, said session data including at least a name of an application launched by the source device to establish the user session with the session end point device;
    upon receiving the request to transfer the user session and the session data, initiating, by the target device, a session transfer process with a session transfer server, wherein the session transfer server determines a launch application that is required to be launched by the target device to take over the user session with the session end point device;
    initiating, by the target device, a transfer of the user session by launching the launch application determined by the session transfer server;
    upon the launch of the launch application, establishing, by the target device, a communication channel with the session end point device, and negotiating resolution parameters for the new session when establishing the communication channel with the session end point device, and
    terminating, by the target device, the user session at the source device by sending a user session terminate signal to the source device.

2. The method of claim 1, wherein the user session transfer request is automatically received at the target device when the target device is within a predefined proximity to the source device.

3. The method of claim 2, wherein the predefined proximity corresponds to a maximum allowable distance between the source device and the target device within a network to which the source device and the target device are both connected.

4. The method of claim 1, wherein the user session transfer request is received at the target device upon receipt of a swipe input at the source device.

5. The method of claim 1, wherein the user session transfer request is received at the target device upon receipt of a push button input at the source device.

6. The method of claim 1, wherein the session data further includes credentials for the user session.

7. The method of claim 1, wherein the user session is a video conference session.

8. The method of claim 1, wherein the launch application is a video conference application.

9. A system for transferring a user session to a target device, the system comprising:
    a target device including
        a network interface configured to receive a user session transfer request and session data from a source device and configured to send a user session termination signal to the source device;
a memory configured to store the session data and computer executable instructions; and
a session transfer module including at least one processor configured to execute the computer executable instructions to:
receive a request to transfer a user session from the source device to the target device;
in response to receiving the request to transfer the user session, transmit a session data request to the source device, wherein said session data is associated with the running session between the source device and the session end point device;
subsequent to transmitting the session data request, receive session data corresponding to the user session transfer request, said session data including at least a name of an application launched by the source device to establish the user session with the session end point device;
upon receiving the request to transfer the user session and the session data, initiate a session transfer process with a session transfer server, wherein the session transfer server determines a launch application that is required to be launched by the target device to take over the user session with the session end point device;
initiate a transfer of the user session by launching the launch application determined by the session transfer server;
upon the launch of the launch application, establish a communication channel with the session end point device, and negotiate resolution parameters for the new session when establishing the communication channel with the session end point device; and
terminate the user session at the source device by sending a user session terminate signate to the source device.

10. The system of claim 9, wherein the user session transfer request is automatically received at the target device when the target device is within a predefined proximity to the source device.

11. The system of claim 10, wherein the predefined proximity corresponds to a maximum allowable distance between the source device and the target device within a network to which the source device and the target device are both connected.

12. The system of claim 9, wherein the user session transfer request is received at the target device upon receipt of a swipe input at the source device.

13. The system of claim 9, wherein the user session transfer request is received at the target device upon receipt of a push button input at the source device.

14. The system of claim 9, wherein the session data further includes credentials for the user session.

15. The system of claim 9, wherein the user session is a video conference session.

16. The system of claim 9, wherein the launch application is a video conference application.

* * * * *